UNITED STATES PATENT OFFICE.

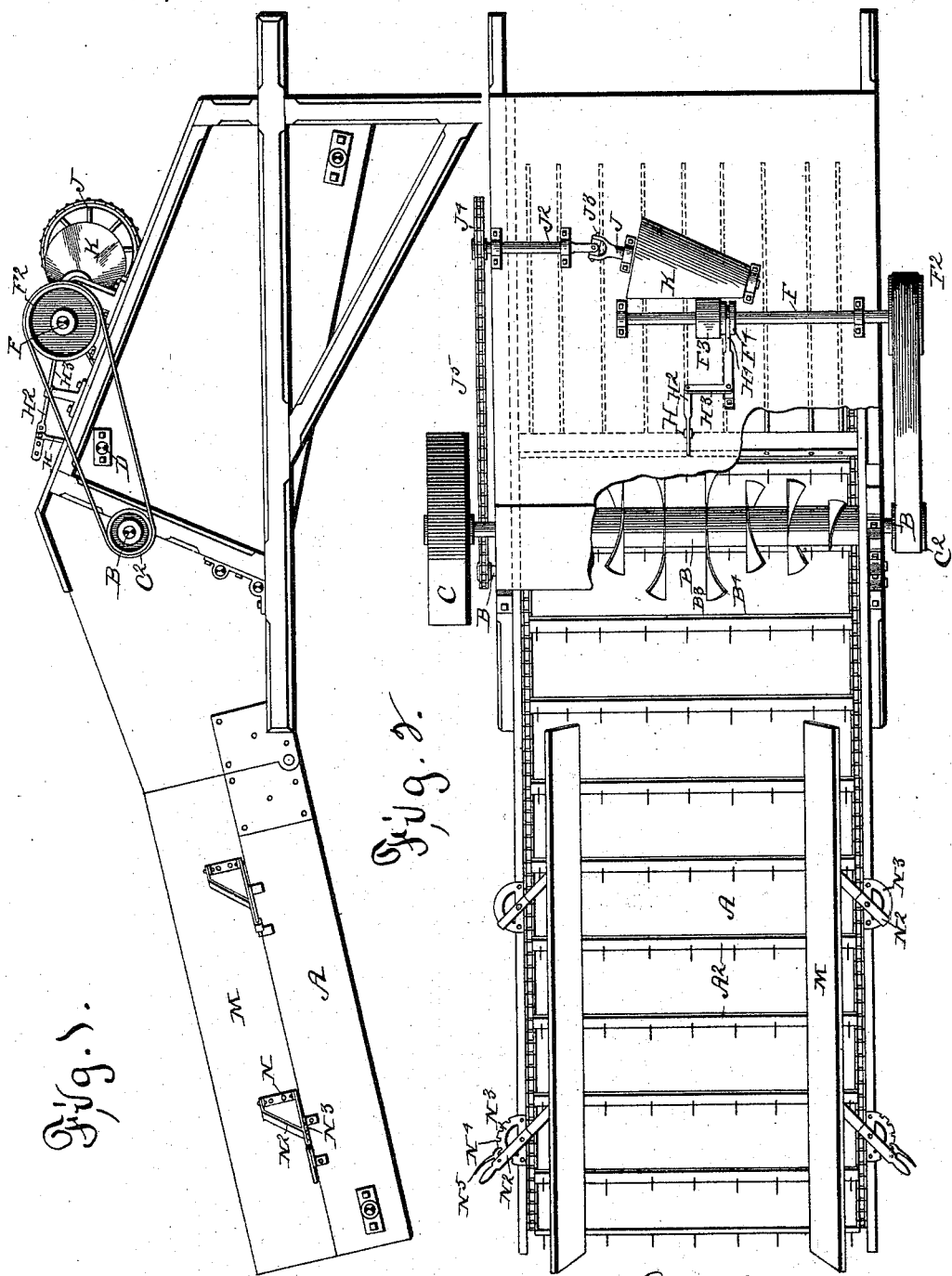

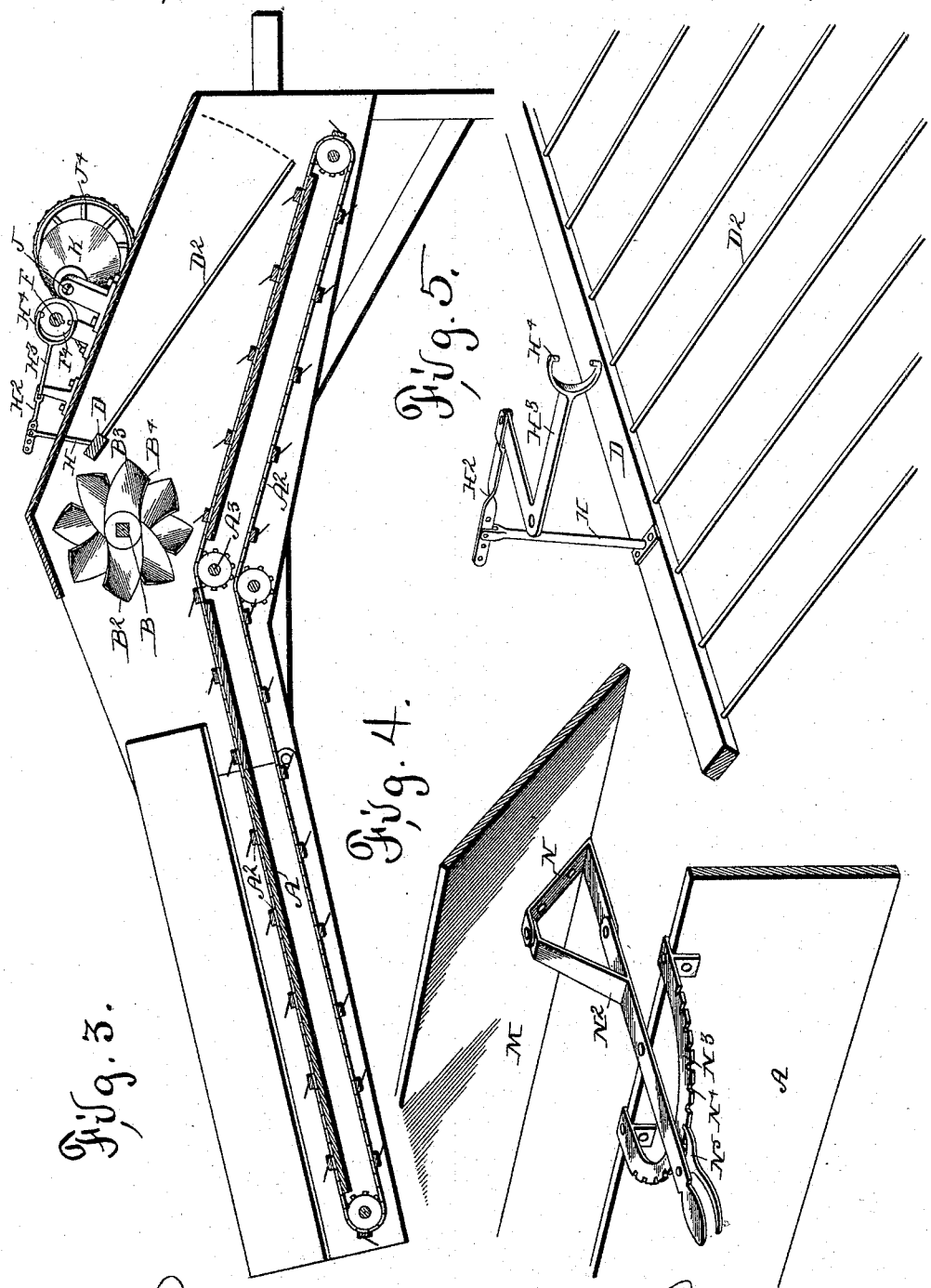

WILLIAM MORLEY, OF FONTANELL, IOWA.

BAND-CUTTER AND FEEDER.

SPECIFICATION forming part of Letters Patent No. 573,898, dated December 29, 1896.

Application filed July 14, 1896. Serial No. 599,196. (No model.)

*To all whom it may concern:*

Be it known that I, WILLIAM MORLEY, a citizen of the United States of America, residing at Fontanell, in the county of Adair and State of Iowa, have invented certain new and useful Improvements in Band-Cutters and Feeders, of which the following is a specification.

The objects of this invention are, first, to provide means of simple, strong, and durable construction, whereby the speed of the conveyer that carries the grain to the thresher is automatically controlled by the amount of grain on the conveyer, that is, when the conveyer is feeding grain too rapidly the speed of the conveyer is slackened.

A further object is to provide improved band-cutting knives that will also distribute the grain laterally over the conveyer to feed it to the threshing-cylinder in an even and regular manner.

A further object is to dispense with the use of a center board over the conveyer by providing side boards that may be adjusted to and from the longitudinal center of the conveyer, and the irregular feeding of the machine, caused by placing the sheaves on the conveyer or one side only of a center board, be prevented and made impossible.

My invention consists in certain details of construction, arrangement, and combination of parts, as hereinafter set forth, pointed out in my claims, and illustrated in the accompanying drawings, in which—

Figure 1 shows a side elevation of the complete band-cutter and feeder. Fig. 2 shows a top or plan view of the same with parts broken away to show the knives. Fig. 3 shows a longitudinal section of the complete device. Fig. 4 shows a detail perspective of one of the devices for adjusting the side boards, and Fig. 5 shows the device for operating the sliding brush-wheel to increase or diminish the speed of the conveyer.

Referring to the accompanying drawings, the frame of the device is seen to be of the usual construction, having a bottom A, inclined first upwardly and then downwardly toward the threshing-cylinder, with an endless conveyer $A^2$ passing over and under the bottom on suitable sprockets and driven from a shaft $A^3$, located near the central portion of the conveyer.

Located in the frame of the device over the highest point of the conveyer is a rotatable shaft B, having knives $B^2$ thereon to sever the bands of the sheaves carried on the conveyer. These knives each have two blades extended outwardly from the shaft in opposite directions and having a sharp straight edge $B^3$ on the front of each blade and then bent laterally at $B^4$. The straight-edged knives sever the bands in the usual way, and the bent portions of the blades then engage the loose grain and spread it out over the conveyer. These blades are arranged on the shaft with said bent edges inclined in opposite directions from the center of the shaft, so that a sheaf of grain carried on the central portion of the conveyer will be spread out laterally equally in both directions and fed to the cylinder equally from each side.

A belt-wheel C on one end of the shaft B is driven from the thresher, and a smaller belt-wheel $C^2$ on its other end is used to transmit power to the conveyer, as will be hereinafter set forth.

D indicates a rock-shaft mounted in the frame in the rear of and above the shaft B, and $D^2$ indicates a number of bars fixed to said rock-shaft and extended rearwardly over the end of the conveyer. It is obvious that when a great quantity of grain is carried by the conveyer the said bars will be elevated and as the quantity lessens they will fall by gravity. This of course rocks the shaft D.

The top of the rear end of the conveyer-frame is covered and on its top is mounted in suitable bearings a shaft F, having on its end a belt-wheel $F^2$, which is driven from the belt-wheel $C^2$, and hence rotates the shaft at an even rate of speed. Upon the shaft F is feathered a brush-wheel $F^3$, and on this brush-wheel is a grooved collar $F^4$. The said brush-wheel is moved longitudinally on the shaft by means of and in proportional relation to the rise and fall of the said bars by means of the arm H, fixed to and projecting upwardly from the rock-shaft D to a rod $H^2$, adjustably attached thereto and pivoted to a bell-crank lever $H^3$, which is mounted on top of the conveyer-cover and is provided with a bifurcated end $H^4$, placed in the annular groove of the collar $F^4$.

J indicates a shaft rotatably mounted on top of the machine-frame adjacent to the shaft F and at an acute angle relative thereto. A second shaft $J^2$ is connected thereto, preferably, by means of a universal joint $J^3$ and is extended parallel with the shaft F. On its outer end is a sprocket-wheel $J^4$, geared direct to the shaft $A^3$, which drives the conveyer by means of the sprocket-chain $J^5$. The shaft $J^2$ is provided with a cone-shaped friction-gear K, having one edge in frictional contact with and parallel to the brush-wheel $F^3$. It is obvious that an upward movement of the bars $D^2$, caused by an increase in the quantity of grain on the conveyer, will move the arm H forwardly and hence slide the brush-wheel $F^3$ toward the enlarged gear K and thereby reduce the speed of rotation of the shaft $J^2$, which by being geared to the shaft that drives the conveyer will of course decrease the speed of the conveyer and hence reduce the quantity of grain fed without in any way interfering with the speed of the thresher. The device may be adjusted to threshers of any capacity by changing the position of the arm H in the rod $H^2$.

I have also provided means for adjusting the side boards M to and from the center of the conveyer, so that when the full capacity of the conveyer is not used all of the grain is fed to the center of the band-cutting knives and the bundles held longitudinally on the conveyer as follows: N indicates brackets secured to the outer surface of the side boards at each end, and $N^2$ indicates levers pivoted to the brackets and to the stationary or under section of the sides of the conveyer-frame, with their outer ends resting on a segmental bar $N^3$, fixed to the frame. The device at the rear end of each side board is provided with a segmental rack $N^4$ and a spring-actuated detent $N^5$, mounted on the lever to engage said rack. When said lever is operated, the entire board is moved to or from the center of the conveyer, and the feeding from one side only, which was common in machines using a center board, is entirely obviated. This device for adjusting the side board, as well as the construction of the band-cutters, coöperates with the conveyer-speed-controlling mechanism in this way.

It is understood that the speed of the feeding mechanism is controlled by the depth of grain carried by the conveyer, and that if the grain is deeper at one point than another the speed will be controlled as though the amount of grain was the same over the entire conveyer as at its deepest point.

It is of course of advantage to feed the grain evenly to the threshing-cylinder; but this is only secondary to the main purpose of controlling the amount fed.

Having thus described my invention, what I claim as new therein, and desire to secure by Letters Patent of the United States therefor, is—

1. In a band-cutter and feeder the combination of a conveyer, a speed-controlling device mounted above the conveyer and capable of being raised by means of grain on the conveyer and lowered by gravity, a rotatable shaft on the machine-frame, gearing for connecting it with the conveyer, a cone-shaped gear connected with said shaft for rotation, a brush-wheel slidingly mounted to engage the cone-gear, means for rotating the brush-wheel, and a series of levers for connecting the speed-controlling device with the brush-wheel, substantially as and for the purposes stated.

2. In a band-cutter and feeder, the combination of a suitable endless conveyer, a rock-shaft mounted in the machine-frame, rods fixed thereto to extend over the conveyer, an arm fixed to the shaft and extended upwardly, a shaft mounted on top of the machine-frame, a brush-wheel slidingly mounted thereon, means for connecting said arm and brush-wheel, a second shaft on the machine-frame, a cone-shaped gear fixed thereto, to be engaged by said brush-wheel, and means for driving the endless conveyer from said latter shaft.

WILLIAM MORLEY.

Witnesses:
J. M. PUSEY,
G. G. BAIRD.